April 6, 1948.  E. H. LANGE  2,439,010
PORTABLE COLLAPSIBLE POWER-DISTRIBUTION TOWER FOR ELECTRIC LAWN-MOWERS
Filed July 2, 1947
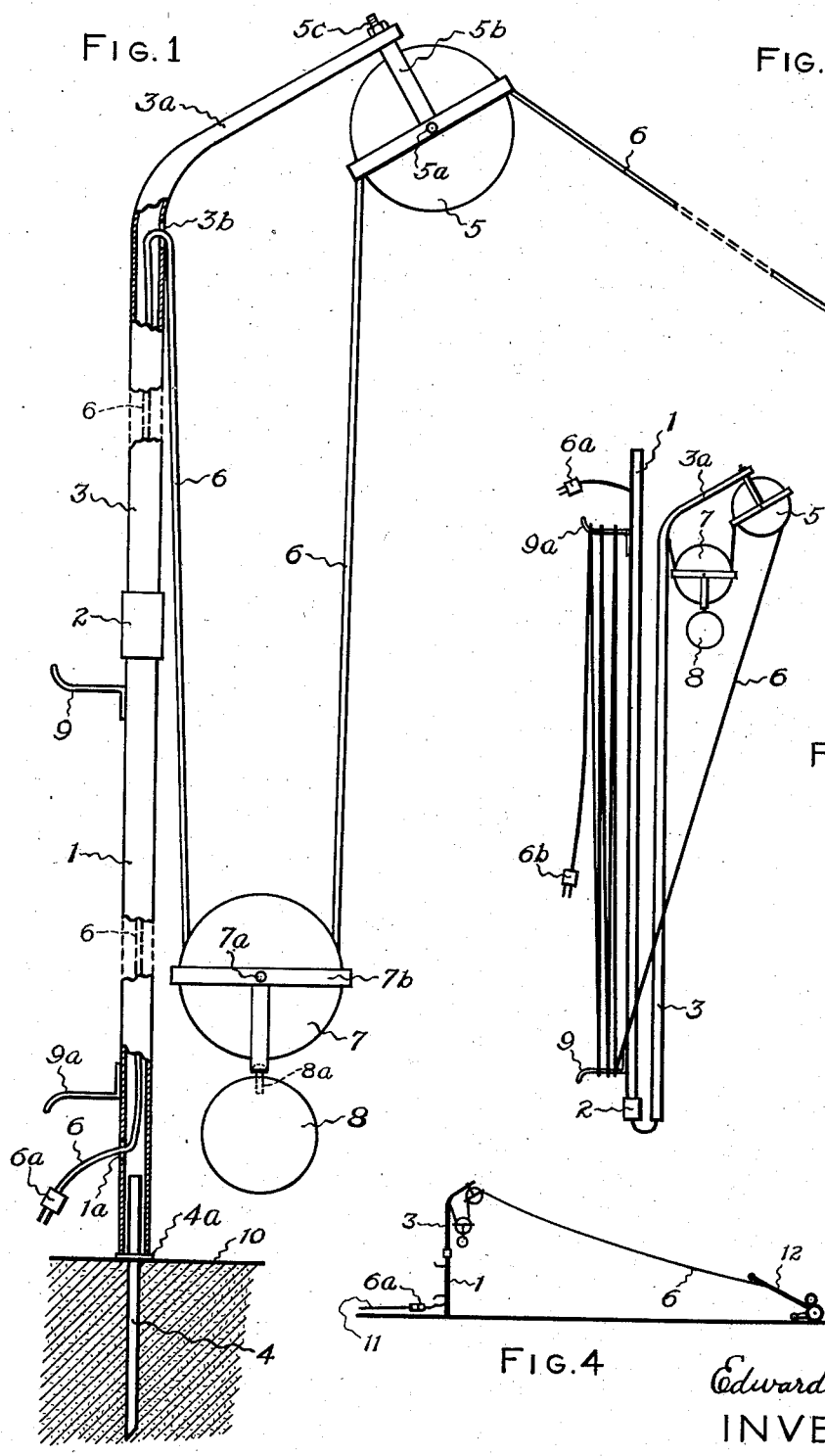
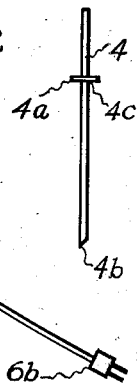
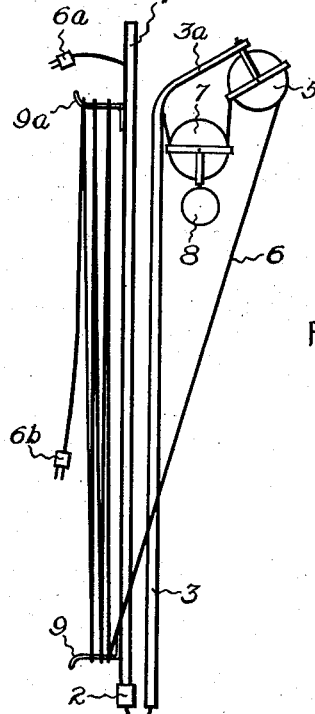
Fig.1  Fig.2  Fig.3  Fig.4
Edward H. Lange,
INVENTOR Patented Apr. 6, 1948

2,439,010

UNITED STATES PATENT OFFICE 2,439,010

PORTABLE COLLAPSIBLE POWER-DISTRIBUTION TOWER FOR ELECTRIC LAWN MOWERS

Edward H. Lange, Baltimore, Md.

Application July 2, 1947, Serial No. 758,588

2 Claims. (Cl. 242—47.5)

This invention relates to electrically operable lawn mowing machines, and more particularly to means for improving the mobility of such machines over a lawn, and for reducing the opposition to maneuverability of such machines introduced by an electric-power supply line necessarily extending from the source of electric power to a lawn mowing machine, and requiring frequent rearrangement.

The principal object of this invention is to provide a structure having a high degree of economy and ease of temporary erection, removal, and storage, and providing a light-weight facility for controlling the disposition of the electric-power supply line over a large area of operation of an electric-power operable lawn mowing machine.

Another object of this invention is to provide a simple and economical ground-pin means for supporting a tower-structure and for providing swivel means for accommodating angular displacements of the supply line.

A further object is to provide a collapsible tower so that advantageous heights for substantial ground-coverage by the lawn mowing machine can be easily employed.

Still another object is to provide simple means for the quick disposal of the large length of supply line without a tangle, including means upon the tower-structure for holding a winding of the supply line.

These objects and others, will be better understood by reference to the following specification, and to the accompanying drawings.

In the drawings, Fig. 1 illustrates a complete assembly of the erected power-distribution tower for controlling displacements of the supply line to an electrically operable lawn mowing machine, and as temporarily erected for purposes of lawn cutting.

Fig. 2 illustrates details of the ground-pin; Fig. 3 illustrates a collapsed form of the structure of Fig. 1 for storage purpose, and Fig. 4 illustrates in diagram form an electrically operable lawn mowing machine connected to an erected power-distribution tower such as detailed in Fig. 1.

Referring to the drawings, at 4 is a ground-pin having an annular ring or washer-member 4a tightly fitting thereon; the ground-pin 4 is a rod of circular section, and has the end 4b cut at an angle suitable for easy penetration of the ground by impact thereon. The washer-member 4a is fastened to the ground-pin 4 by burring-over into an indentation in the ground-pin, or by welding, at the under side of the washer-member adjacent the pointed end 4b and indicated by the position 4c, or by other well known means; the washer-member 4a is located between the extremities of the ground-pin 4, the below-ground portion of the ground-pin 4 being of adequate length to support the structure hereafter described, and against lateral pull upon the supply line 6. Likewise the above-ground portion of the ground-pin 4 between the washer-member 4a and the end of ground-pin 4 opposite to 4b is of adequate length for this purpose.

At 1 is a lower tubular-member, having a hole 1a through the wall of tubular-member 1, near one end of this member, and at the opposite end of tubular-member 1 a sleeve-member 2 is securely fastened concentrically with the axis of tubular-member 1, and extending beyond the end of tubular member 1 to which it is fastened. Sleeve-member 2 serves as a socket for holding the upper tubular-member 3; the upper tubular-member 3 may be of the same outer-diameter as lower tubular-member 1, and sleeve-member 2 serves to provide a sliding fit to accommodate the upper tubular-member 3 and securely hold the upper tubular-member for the purposes of this invention. At 3a is an angular off-set in the upper tubular-member 3, and at 3b just below said angular off-set is a hole through the wall of upper tubular-member 3, underneath the projection of tubular member 3 laterally. Tubular-members 1 and 3 are preferably thin-walled conduit, such as light weight electrical conduit, normally of steel, or may be of other material such as aluminum, and the angular off-set 3a may be effected by bending the tubular-member 3 near one of its extremities. A pulley 5 free to turn about shaft 5a, and mounted in the pulley-housing 5b is attached to the extremity of the angular off-set 3a, and securely fixed to tubular-member 3, for example by bolt 5c through the housing 5b of pulley 5, and through tubular-member 3, in such a manner that the plane of pulley 5 is substantially coincident with the plane of angular off-set 3a through tubular-member 3. The housing of pulley 5 is understood to provide a guard around the pulley 5 for aiding in confining the supply line 6 to the pulley-groove, in a manner well understood; this may be for example a T-shaped housing with the stem of the T containing the bolt 5c, and the guard means extending to ninety-degrees on each side of the bolt 5c. The end of tubular-member 3 opposite the angular off-set 3a to which pulley 5 is attached, is supported in the sleeve-member 2 by tubular-member 1, the tubular member 1 being adapted to fit loosely over the above-ground portion of the ground-pin 4, and to ride upon the washer-member 4a. The supply line 6 has the plug-attachment 6b for connection to the electric motor of the electrically operable lawn mowing machine. When the power-distribution tower is erected for use, ground-pin 4 is driven into the ground 10, for example by means of a hammer, and in a suitable central location in relation to the ground to be covered by the lawn mowing machine and the known range of the power-distribution tower.

At 7 is a lower pulley means, having the shaft 7a upon which pulley 7 is free to turn, and the pulley housing 7b which supports the shaft 7a and also serves as a guard to aid in confining the supply line 6 to the under side of pulley 7. Attached to the pulley housing 7b is a weight means such as 8, for stabilizing the lower pulley means against upsetting when a sudden slack is introduced upon the supply line 6, and for positively lowering the pulley 7 with any displacement of the lawn mowing machine toward the tubular-member 1, and such that the distance between plug-attachment 6b and pulley 5 is shortened. The pulley-housing 7b for pulley 7, may for example be a T-shaped housing with the stem of the T projecting downward, and the weight means 8 is securely attached to this downwardly projecting stem for example by the bolt 8a. The stem of the T-shaped housing 5b of pulley 5 is understood to project upwardly, and the pulley 5 to be suspended below the angular off-set 3a by the bolt 5c.

The pulleys 5 and 7, and the respective housings, are understood to be light-weight structures, for example pressed sheet aluminum, and to have sufficient diameter so as to produce only a gradual flexing of the supply line 6 in operation. The supply line 6 passes from the plug-attachment 6b over the top of pulley 5, under the bottom of pulley 7, and through the hole 3b near the top of tubular-member 3 to the inside of this tubular-member, and continues on through tubular-member 1 to the outside of tubular member 1 through the hole 1a above the ground-pin 4, at which end the plug 6a is attached. Pulley 5 is attached with a radial distance from tubular-member 3 greater than the diameter of pulley 7, and so as to accommodate the pulley 7 adjacent the tubular-members 1 or 3, and between the pulley 5 and the tubular-members 1 or 3, and the supply line 6 leaves and enters the pulley 7 so that there is no cross-over of these lines.

At 9 and 9a are respectively upper and lower projections attached to the tubular-member 1 for holding a winding of the supply line 6 when the plug-attachment 6b is detached from the lawn mowing machine; by pulling the outstretched supply line 6 extending from the pulley 5, the pulley 7 is raised to close proximity with pulley 5. The supply line 6 may then be tightly wound upon the projections 9 and 9a to prevent entanglement of the supply line. The upper tubular-member 3 may then be disengaged from the sleeve 2 and lower tubular member 1 for purposes of storage; the slack of the supply line 6 through the inside of tubular-members 1 and 3 is sufficient for this purpose. This collapsed form is shown in Fig. 3.

The ground-pin 4 may be easily removed from one position in the ground and reinserted in another; the tower may then be mounted in this new location, thereby extending the field of action of the mower. Preferably two such ground-pins may be utilized for simplifying the moving of the tower to a new location, and for avoiding entanglement of the supply line while moving the tower; this makes it unnecessary to extract the original ground-pin before the tower is set up in the new location.

Fig. 4 illustrates an electrically operable lawn mowing machine 12 connected by supply line 6 to an erected power-distribution tower such as heretofore detailed with reference to Fig. 1, and having the plug 6a connected to the line 11 which line is understood to be connected with a power source.

In operation, a semi-circular area may be cut on one side of the tower, and then the complementary semi-circular area on the other side of the tower; in this manner winding of the supply line about the tower in the vicinity of plug 6a is avoided. Swivel action of the tower upon the washer-member 4a permits the pulley 5 to maintain an edgewise direction toward the lawn mowing machine under operating conditions.

With the pulley 7 at the ground level, a length of supply line connected to plug-attachment 6b and extending to the pulley 5 equal to or greater than the total height of the tower is employed; it will thus be seen that an effective radius of operations of nearly three times the tower-height may be obtained by this means, and that a ten foot tower with only a five-foot collapsed length, will provide coverage of a circular area approximating sixty feet in diameter.

Having described how my invention is carried out, it will be apparent to one skilled in the art that modifications may be made in the particular organization shown and described without departing from the scope of my invention, as set forth in the appended claims.

What is claimed is:

1. In a portable collapsible distribution tower for controlling distribution of a power-supply line to an electrically propelled lawn mowing machine, a portable ground-pin swivel means for vertically and laterally supporting said tower comprising a cylindrical rod with a washer-member concentrically fastened thereto, a collapsible pole including an upper tubular-member and a lower tubular-member, said lower tubular-member being adapted to telescope with the above-ground portion of said cylindrical rod and to bear upon said washer-member, said upper tubular-member being adapted to be supported on said lower tubular-member by a sleeve means attached to one of said tubular-members, and having an angular off-set at its upper extremity supporting an upper pulley suspended from said angular off-set; a lower pulley means including a weight means attached to said lower pulley means, an electric supply-line means for extending from said lawn mowing machine to a source of electric power, including a portion of supply-line from said lawn mowing machine extending over the top of said upper pulley, under the bottom of said lower pulley means, through a hole in said upper tubular-member and through the inside of each of said tubular-members to the outside of said lower tubular-member, through a hole in said lower tubular-member, and means for holding a winding of said supply-line, including a projection at each end upon one of said tubular-members.

2. In a supply-line distribution tower for an electrically operable lawn mowing machine, in combination, a portable ground-pin means for supporting said tower, a collapsible pole including an upper tubular-member and a lower tubular-member, said lower tubular-member being adapted to rotatably fit upon an above-ground portion of said ground-pin means, said upper tubular-member being adapted to be supported on said lower tubular-member by a sleeve means attached to one of said tubular-members, and having an angular off-set at its upper extremity supporting an upper pulley suspended from said angular off-set; a lower pulley means including a weight means attached to said lower pulley means, an electric supply-line means for extending from said lawn mowing machine to a source of electric power, including a portion of supply-line from said lawn mowing machine extending over the top of said upper pulley, under the bottom of said lower pulley means, through a hole in said upper tubular-member and through the inside of each of said tubular-members to the outside of said lower tubular-member, through a hole in said lower tubular-member, and means for holding a winding of said supply-line including a projection at each end upon one of said tubular-members.

EDWARD H. LANGE.

REFERENCES CITED

The following references are of record in the file of this patent:

UNITED STATES PATENTS

| Number | Name | Date |
|---|---|---|
| 508,534 | Thyll | Nov. 14, 1893 |
| 1,085,729 | Gore | Feb. 3, 1914 |
| 1,411,584 | Peters | Apr. 4, 1922 |
| 1,461,323 | Peters | July 10, 1923 |
| 1,643,656 | Haselton | Sept. 26, 1927 |
| 1,933,163 | Coplen | Oct. 31, 1933 |

FOREIGN PATENTS

| Number | Country | Date |
|---|---|---|
| 2,045 | Australia | May 27, 1926 |